United States Patent [19]

Kanaly

[11] 4,405,943

[45] Sep. 20, 1983

[54] LOW BANDWIDTH CLOSED LOOP IMAGERY CONTROL AND COMMUNICATION SYSTEM FOR REMOTELY PILOTED VEHICLE

[75] Inventor: David B. Kanaly, Melbourne, Fla.

[73] Assignee: Harris Corporation, Melbourne, Fla.

[21] Appl. No.: 294,190

[22] Filed: Aug. 19, 1981

[51] Int. Cl.³ .............................................. H04N 7/18
[52] U.S. Cl. .................................... 358/133; 358/103; 358/109
[58] Field of Search ........................ 358/133, 109, 103

[56] References Cited

U.S. PATENT DOCUMENTS

| | | | |
|---|---|---|---|
| 3,557,304 | 1/1971 | Rue et al. ............................. | 358/103 |
| 3,752,911 | 8/1973 | Morchand et al. .................. | 358/133 |
| 4,267,562 | 5/1981 | Raimondi ............................. | 358/109 |

Primary Examiner—Robert L. Griffin
Assistant Examiner—Edward L. Coles
Attorney, Agent, or Firm—Antonelli, Terry & Wands

[57] ABSTRACT

In a video imaging and transmission system, the entire field of view of camera equipment aboard a remotely piloted vehicle is imaged as high resolution data. This high resolution data is digitized and stored in memory aboard the remote vehicle. In order to reduce the bandwidth of the information which is to be transmitted to a ground-based operator, only a selected portion of the stored high resolution data, corresponding to the output of oculometer and head position equipment that monitors the operator's look angle at a display, is read out from memory and transmitted as high resolution data. The remaining portion of the image provided on the operator's display is comprised of low resolution data derived from the high resolution data stored in memory. Because the high resolution data is obtained from memory and not from the camera equipment directly, the camera is effectively decoupled from the data link. As such, the system permits the camera to be a single movable sensor or an array of multiple fixed sensors. It also substantially increases the speed of operation of the system.

47 Claims, 3 Drawing Figures

LOW BANDWIDTH CLOSED LOOP IMAGERY CONTROL AND COMMUNICATION SYSTEM FOR REMOTELY PILOTED VEHICLE

FIELD OF THE INVENTION

The present invention relates to high resolution video transmission systems and, more particularly, to a communication system for providing high resolution imagery information to the controller of a remotely piloted vehicle.

BACKGROUND OF THE INVENTION

As the development of optical scanning systems and video transmission systems has continued to improve, the use of such systems for remote tele-monitoring and for control purposes, such as in remotely piloted vehicles (e.g. reconnaissance and weapon delivery aircraft) has become particularly attractive. In the course of operation of such systems an operator, usually ground based, communicates with and may actually control the flight of the remote vechicle via a control/display console which is coupled with camera and guidance control equipment on the remote vehicle by means of a radio communication link. A general illustration of such a system is shown in FIG. 1, wherein an operator 10 at a control/display console 40 observes on the face of a display 50 (e.g. a CRT display) a scene 30 as viewed by camera equipment carried by a remotely piloted vehicle 20, signals representative of the scene having been transmitted over an imagery communication link to the ground station. The control console 40 normally permits the operator to return guidance and camera-pointing commands to the remotely piloted vehicle 20. The function of the operator may typically require him to maneuver the remotely piloted vehicle and/or slew the camera equipment so as to observe navigation landmarks over which the remotely piloted vehicle flies. Upon approaching a remote target area, the aircraft and/or the camera are maneuvered so as to permit the viewing optics clearly observe the target; the returned video data is recorded and subsequently transferred to a permanent hard copy photograph of the scene for detailed analysis. Since it is normally required that the image returned to the command console be of a fairly high quality, particularly in the case of a reconnaissance flight, the data link bandwidth for effecting the required transmission of video information can be very high.

In an effort to reduce this bandwidth, there have been proposed imaging/transmission systems whereby only a delimited portion of the scene being displayed to the console operator contains a high resolution image. The premise upon which such systems operate is the fact that the portion of a scene observed by an individual at any instant contains much more information than the observer can use. Using this underlying principle, such systems control the action of the camera equipment upon the remote vehicle so as to effectively reduce its field of view or so as to confine the high resolution portion of its field of view to a delimited area, a displayed image for which is observed directly upon the console display screen by the operator. In order to accomplish this task, such systems employ, as part of the command console, an oculometer which observes where the eye of the operator is looking on the display screen. The oculometer generates signals that are transmitted to the remote vehicle to operate a camera servo mechanism so as to point the high resolution imaging optics to that location on the scene being simultaneously viewed by the camera equipment and the console operator.

Exemplary patent literature which describes such systems includes the U.S. patent to Holmes U.S. Pat. No. 3,507,988 and the U.S. patent to Lewis U.S. Pat. No. 4,028,725. The systems described in these patents employ an operator viewing position sensor which generates output signals indicating the point of observation on a display screen of the operator. The output signals are used to control high resolution viewing optics so as to maintain the high resolution image of the scene at the location where the observer is looking.

In the system described in the Holmes patent, an eye position sensor monitors the movement of the observer's eye and causes a high resolution spiral scan pattern of a camera tube to be centered about the observer's instantaneous line of sight. Simultaneously, a display tube located at the observer's console, which receives video information corresponding to the high resolution scan from the remote camera, will recreate such information at that point on the display tube being observed by the operator.

Similarly, in the system described in the Lewis patent the output of an oculometer system, which monitors helmet position and eye angle position, drives respective servo mechanisms in the remote vehicle and at the display terminal. The remote vehicle includes a narrow field of view sensor whose optical axis is made to coincide with the axis of observation of the control console operator as he views the display image. The system also includes a lower resolution wide field of view sensor, image data for which is transmitted from the remote vehicle to the control console and is combined with the high resolution information to provide background adjacent the high resolution portion of the scene to which the operator's view is directed.

Basically, each of the systems described in these patents includes a high resolution imaging system and a low resolution imaging system mounted within the remotely piloted vehicle. The oculometer output signals are caused to operate a camera servo mechanism which effectively maintains the high resolution portion of the scanning optics directed at that portion of the scene to which the eyes of the observer are directed (i.e. the operator's instantaneous look angle). With these types of systems, the camera in the remotely piloted vehicle must be continuously coupled to the data link between the remote vehicle and the observer's console. Moreover, it is the operation of the camera equipment, including slewing of the same in a remotely piloted vehicle, that is made to respond to the look angle of the console operator.

SUMMARY OF THE INVENTION

As opposed to the prior art approach of achieving bandwidth reduction by direct control of the action of the camera equipment in the remotely piloted vehicle, the present invention seeks to effectively decouple the camera equipment from the data link. To accomplish this, and still provide the high resolution information required by the observer on the ground, the present invention employs a video imaging and transmission system in which the entire field of view of the camera equipment on the remote vehicle is imaged as high resolution data. This high resolution data is digitized and stored in memory aboard the remote vehicle. However, for the purpose of reducing the bandwidth of the information which is transmitted to the console operator, only a selected portion of the stored high resolution data is read out from memory and transmitted as high resolution data. The remaining portion of the image provided on the operator's display console is comprised of low resolution data derived from the high resolution data stored in memory and transmitted from the remote vehicle to the operator's console. Because the high resolution data is obtained from memory and not from the camera equipment directly, as in the prior art, the scheme in accordance with the present invention permits the camera to be effectively decoupled from the data link. As such, the system permits the camera to be a single movable sensor or an array of multiple fixed sensors. It also substantially increases the speed of operation of the system. Namely, a considerably shorter period of time is required to simply fetch data from memory, as compared to having to slew a camera, as in the prior art systems described above. The savings in time in fetching the data from the memory permits the use of more time for digitizing, formatting, processing, etc. without delaying the image so much as to be noticeable by the console operator.

In accordance with a preferred embodiment of the present invention, the communication link between the control console and the remotely piloted vehicle is an anti-jam communication link adding to the security of the communication. For this purpose, a suitable security imparting modulation scheme, such as a spread spectrum communication technique, is employed for encoding and transmitting the digital data between the remotely piloted vehicle and the console operator.

As an adjunct to the normal mode of operation of the imaging and transmission system briefly outlined above, the present invention also offers the capability of obtaining a high resolution image of the entirety of a particular scene of interest. In this mode, the oculometer control unit is effectively bypassed, so that the contents of memory and the displayed image are frozen. Then the entirety of the high resolution data representative of the displayed scene of interest, but only a portion of which data has been transmitted and displayed as high resolution data, is read out of memory and transmitted from the remote vehicle to the control console for display or recording via auxiliary equipment. In this mode, a rapid response time to the change in look angle of the operator is no longer important (the look angle is effectively frozen), so that a longer period of time can be used to transmit all of the high resolution data to the command console for display or recording.

DETAILED DESCRIPTION OF THE INVENTION

Figure 1:
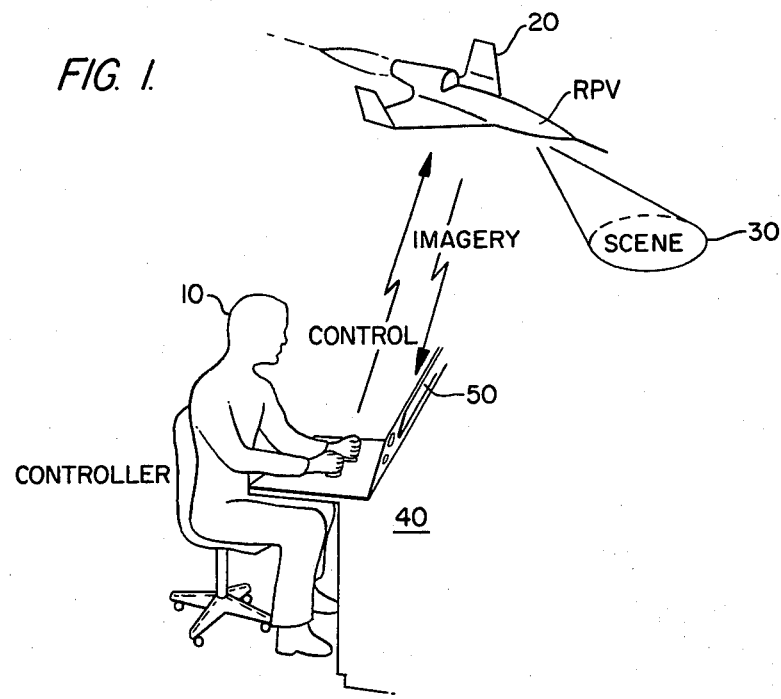
FIG. 1 is a general illustration of a communication link between a remotely piloted vehicle and an operator's command console.
Figure 2:
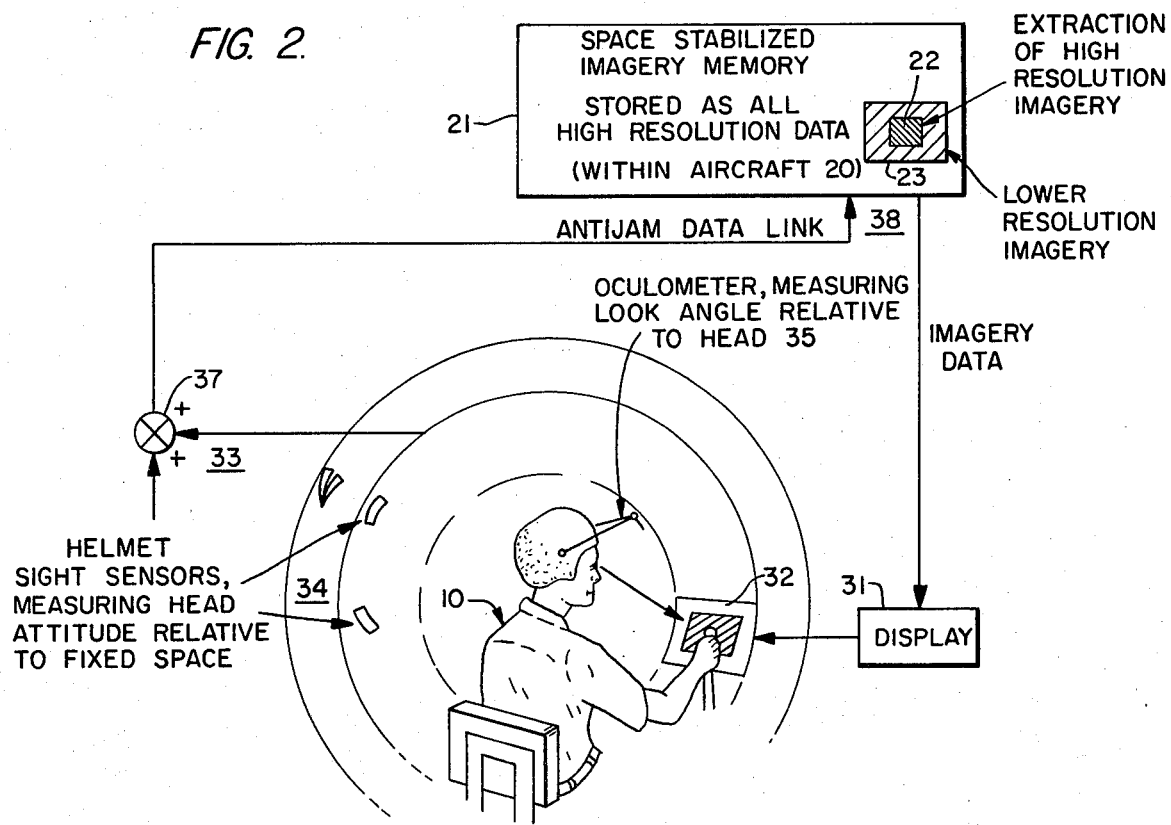
FIG. 2 is a pictorial/block diagram illustration of a closed loop imagery control system in accordance with the present invention.

Referring now to FIG. 2 there is shown a pictorial/block diagram illustration of the present invention, wherein a console operator 10 communicates with a remotely piloted vehicle 20, e.g. a remotely piloted aircraft, containing imaging optics and processing-equipment that provide video data for transmission to and display upon the console manned by the operator in order to assist him in controlling the vehicle. Typically, the operator will not only control the viewing optics aboard the vehicle, but also the actual flight of the vehicle. As the control of the flight of the vehicle, per se, does not form part of the present invention, the details of the same will not be described here. Instead, the description to follow will delineate the manner in which the console operator may be provided with high resolution data over a reduced bandwidth and secure communication link offering the above noted advantages over the prior art.

Now, associated with the console operator 10 are in oculometer 35, which monitors the look angle of the operator relative to his head position, and helmet sight sensors 34, which measure the head attitude relative to a fixed position in space. These components will be referred to generally as oculometer equipment 33, from which there is obtained a total look angle representative of the point on a display screen 32 which presents a video image originally derived from the camera equipment on the remotely piloted vehicle 20 and which is directly observed by the operator 10. The oculometer equipment to be employed for this purpose may be the type described in the above-reference patent to Lewis. The oculometer equipment of the system described in the Lewis patent includes both an eye angle detector and a helmet position detector, output signals from which represent a specific location on the image displayed by the console upon which the optical axis of the eye of the observer impinges. This is usually within a fairly narrow high resolution viewing zone, of plus or minus 1 to 2 degrees. It is for this reduced or narrow field of view that the corresponding portion of the transmitted scene being displayed is to be presented as a high resolution image. The remainder of the field of view may contain low resolution data since the ability of the human eye to observe high resolution data outside this narrow cone is extremely limited; the low resolution data is provided for the surrounding scene approximately consistent with the ability of the observer to sense it. This high and low resolution video data is generated by the processing/transmission equipment in the remote vehicle 20 and, together with attendant synchronizing and control signals, is transmitted over a preferably secure (anti-jam) communication link 38 to display processing equipment 31 at the operator's control station. The display processing equipment 31 is coupled to the console display 32 (e.g. CRT display) to provide the received video-data for direct viewing by the operator.

Within the aircraft 20 itself are imaging optics (not shown) and attendant digital memory 21 into which data representative of the entire field of view of the imaging optics is stored as high resolution data. Using the remote piloted vehicle attitude as measured by on-board control sensors, the high resolution data from the camera equipment is stored in fixed space coordinates. The hatched area 23 shown within the memory block 21 of FIG. 2 corresponds to the low resolution imagery portion surrounding a high resolution imagery portion 22. The high resolution imagery portion 22 corresponds to the delimited high resolution image zone extracted by the oculometer equipment 33 in response to the eye position and head position of the operator 10 as he observes the display image 32 on his operator's console. Since the entirety of the image produced by the optical equipment on board the remotely piloted vehicle 20 is stored in memory 21 as high resolution data, any portion of the scene being observed by the optical equipment can be selected and transmitted to the control station as high resolution data. However, as pointed out previously, only an abbreviated portion of the image contained in memory is normally read out and transmitted as high resolution data, since the actual high resolution field of view of the observer is extremely reduced.

Those portions of the image-representative data stored in memory which are adjacent to the high resolution data to be transmitted (and also which contain high resolution data) are converted into low resolution data for transmission in order to fill up the remainder of the image to be displayed by the control console. Conversion of such low resolution data can be simply effected by a number of techniques, such as averaging adjacent lines of data or the selective addressing of segments of memory adjacent that portion of memory from which the high resolution data is obtained. A more detailed explanation of such image-extraction and transmission scheme that may carried out by the various components of which the system according to the present invention is comprised will be presented below in conjunction with the description of FIG. 3.

Figure 3:
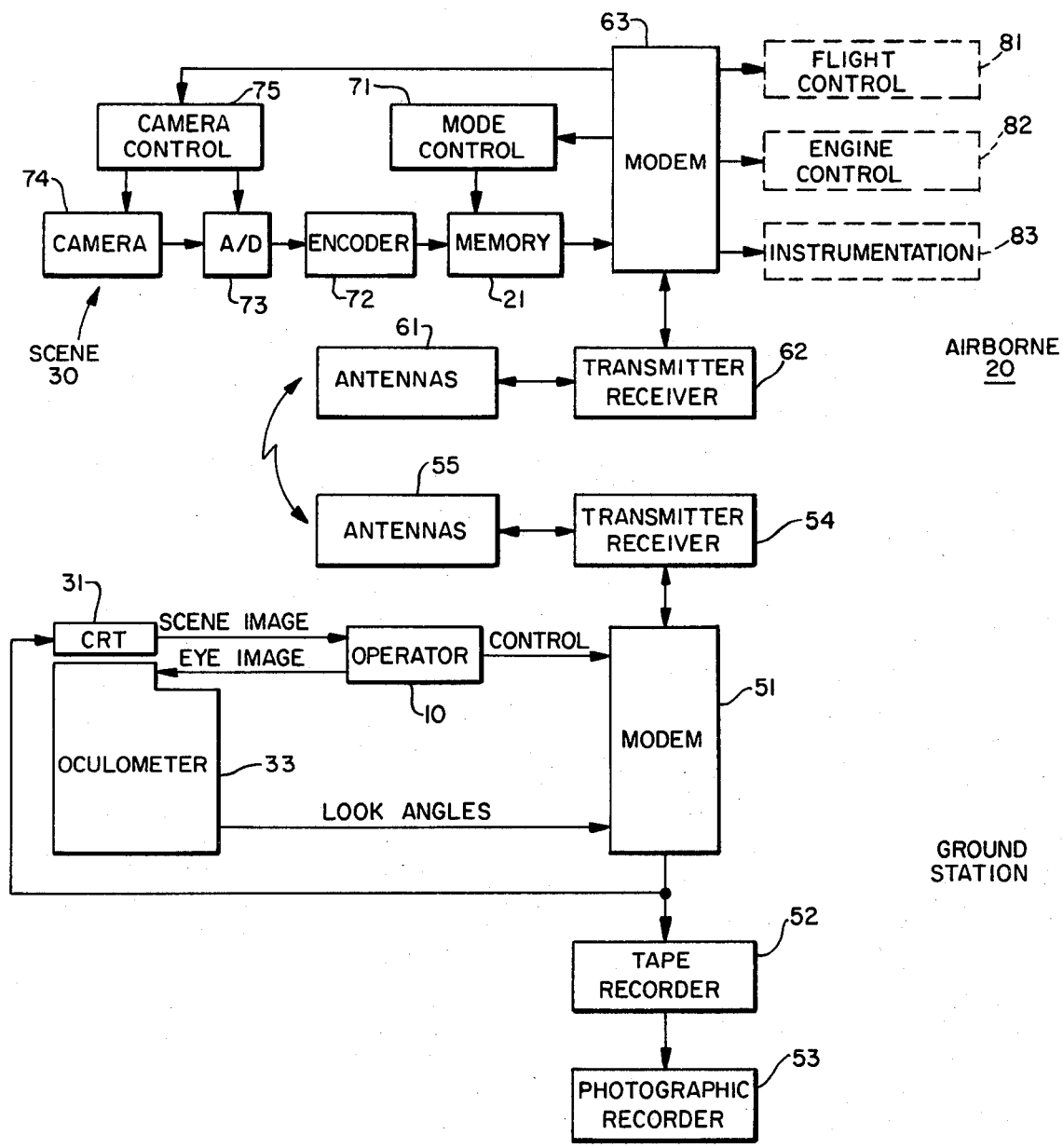
FIG. 3 is a schematic block diagram of the high resolution closed loop imagery control system shown in FIG. 2.

Referring to FIG. 3, there is shown a detailed block diagram of the high resolution closed loop imagery control system in accordance with the present invention which has been shown more generally in FIG. 2. Where like designations of FIG. 3 are used to describe like components of FIG. 2, the same reference number have been used. It is to be observed that the individual components, per se, of which the overall system is configured, may be selected from commercially available sources or implemented using ordinary technical skills. As such, the details of such components need not be described herein and the description of FIG. 3 will, instead, be directed to the manner in which the respective units are interconnected and cooperate with one another to provide the reduced bandwidth video transmission system set forth more generally in the previous description.

The system may be divided into two parts, a first of which corresponds to the control station manned by the operator 10 (or ground pilot) and the second of which corresponds to the remotely piloted vehicle 20. The control station includes oculometer equipment 33 and a cathode ray tube a video display 31 associated with the operator 10. From this console, the operator provides control signals and instructions to a data link modem 51 which also receives signals from the oculometer 33 representative of the look angle of the operator upon the image of CRT display 31. Those control signals which relate to the actual flying condition of the vehicle, namely which control flight control surfaces 81, engine control 82 and vehicle instrumentation 83 do not form a part of the present invention and are not necessary for an understanding of the bandwidth reduction scheme persuant to the present invention. They are simply illustrated and explained here for illustrating the background of the environment in which the invention has a special utility.

Also coupled to the modem equipment 51 may be a tape recorder 52 and a photographic recorder 53 for providing a hard copy of image data received at the control station. As will be explained below, for an auxiliary mode of operation, there is no updating of memory data, and the system according to the present invention by passes the oculometer and permits the selective transmission and display of the entire high resolution stored in memory.

Modem 51 preferably includes secure or anti-jam modulation equipment, such as spread spectrum encoding equipment, for providing a secure format for the signals to be communicated between the remote vehicle and the control station. The input/output ports of the modem 51 are coupled to a transceiver 54 having an associated antennas 55.

Aboard the remotely piloted vehicle 20 is an RF antenna unit 61 coupled to transceiver 62 which is associated with another modem 63. Like modem 51 at the control station, modem 63 includes anti-jam communication equipment, such as a spread spectrum modulator-demodulator. Modem 63 extracts camera control output signals originally generated by oculometer 33 of the command station and couples these signals to a camera control unit 75 to which is coupled associated camera unit 74. Camera control unit 75 controls the skewing of the camera 74 and the scanning of the pixels within the camera unit itself to obtain image signals at the output of the camera which are to be digitized by an analog-to-digital converter 73. As the pixels within the camera 74 are being sequentially scanned or addressed by the camera control unit 75 during operation of the camera, the various grey tones of the outputs of the respective pixels are converted into digital format by analog-to-digital converter 73 and then encoded for storage in a digital scene memory 21. With present-day digital signal processing equipment, the number of bits into which the grey levels of the respective pixels are quantized and encoded is at least sufficient to encompass the resolution grey level capacity of the console display at the ground station. For example, for a high resolution CRT capable of accommodating up to sixteen grey levels, four bits are required.

As explained briefly above, the video transmission system of the present invention has two operational modes. During the first, or normal, mode, only a selected and delimited portion of the data stored in memory 21, as determined by the oculometer equipment at the operator's console, is read out and transmitted as high resolution data. It is through this mechanism that the bandwidth reduction sought by the system is attained. During a second, or auxiliary, mode of operation (initiated by the operator), all the image data in memory is read out as high resolution data and transmitted to the control console for display. During this mode, however, the observer's oculometer is decoupled from system control, so that rather than follow the operator's look angle, the system ignores the operator's viewing movements and freezes the scene presented on the display. In this manner, not having to rapidly respond to eye and head movements, the system has sufficient time to transmit a relatively large quantity of high resolution data over a time frame in excess of that for the normal mode, for either temporary display or recording by units 52 and 53. This mode may be selectively used during reconnaissance flights where the operator selects a particular scene for hard copy retention. From his command console he simply uses a mode change command to which mode control unit 71 responds, so as to cause all the image data stored in memory 21 to be read out and transmitted as high resolution data.

For the purpose of carrying out the selective accessing of the contents of memory 21 for the normal and auxiliary modes of operation of the system mode control unit 71 is essentially comprised of memory address control logic that responds to signals from the modem 63 and identifies which portion of the scene stored in memory 21 is to be read out as high resolution data and coupled for transmission to the control station. As explained above in some circumstances, e.g. the auxiliary mode, it may be desired to transmit the entire scene as viewed by the operator as high resolution data and, for this purpose, the mode control unit 71 simply successively addresses the respective locations in memory 21 in which the scene is stored for transmission to the operator at the control station. However, the normal mode of operation of the system, in accordance with the improvement offered by the present invention, is that of selectively addressing the memory 21 to read out therefrom only a segment of the scene within the narrow field of view of the observer as defined by oculometer and of assembling this data for transmission as high resolution data via the transceiver equipment to the control station. In this mode, control unit 71 responds to the signals that have been produced by the oculometer at the control station and derived from modem 63 aboard the remotely piloted vehicle, so as to cause the selectively addressing of memory 21 to directly read out therefrom those portions of memory which correspond to the high resolution portion of the scene. The remainder of the scene, which is also stored as high resolution data, is formatted as low resolution data by a reduced addressing format, whereby the mode control unit 71 causes selected portions of the memory which contain the remainder of the image scene adjacent the high resolution portion being viewed by the observer to be readout and assembled for transmission to the control station.

In this regard, the image pixel data obtained from camera unit 74 and stored in memory 21 may be stored in the form of a matrix of image pixels, each of which is digitized to a prescribed degree of grey tone accuracy, namely some number of bits associated with each image pixel corresponding to the resolution of the operator's display, as explained above. The selective extracting of only a portion of a scene of interest to be transmitted as high resolution data can be simply effected by the sequential addressing of the x-y coordinates within the matrix defined by the position in the scene as represented by the signals from the oculometer 33 at the control station. The remaining pixel data of which the scene is comprised can be assembled as low resolution data by the selective addressing of non-immediately adjacent or spaced apart pixels. Of course, other suitable schemes for producing the low resolution data, such as the averaging of the image data words of adjacent matrix location can also be employed.

As pointed out above, there are two modes of operation of the present invention, a normal mode and an auxiliary mode. In a normal mode of operation, the system is designed to be oculometer responsive, namely only a specific portion of the image being displayed to the operator is to be extracted from memory and transmitted to the ground station as high resolution data. The remainder of the image surrounding the narrow field of view defined by the high resolution data is extracted from memory aboard the remote vehicle and transmitted to the ground station as low resolution data. Thus, at his console, the operator is equipped to monitor the scene presented from the viewing camera aboard the remote vehicle and guide the movement of the vehicle in flight. Again, it is to be observed that the present invention does not relate to the guidance of the vehicle, per se, and no description thereof in conjunction with the operation of the invention will be presented.

During the flight of the remote vehicle, the radio transmission equipment aboard the vehicle is continuously supplying scene data read out from memory 21 and transmitting the same to the ground station to be demodulated and coupled from modem 51 to the operator's CRT display. This image data is originally generated from the sequential horizontal/vertical scanning of the pixels of the camera, converting the various grey tones into digital format, encoding the same and storing the camera image into digital memory. The contents of the memory are continuously updated as the pixels of the camera produce new image information so that, at any time, memory 21 contains a digital code representation of the grey level of each pixel of the camera, namely an encoded representation of the scene being observed by the camera equipment of the remotely piloted vehicle. Pursuant to the present invention, during the normal mode of operation, only a selected segment of the memory, corresponding to the portion of the scene being observed by the operator as detected by the oculometer unit, is extracted from memory as high resolution data. Through selective addressing logical circuitry within mode control unit 71, which responds to the signals from the operator's oculometer equipment 33 at the ground station, as the contents of memory 21 are read out and modulated for transmission to the ground station, only that portion of the memory identified with the oculometer high resolution field of view will be read out exactly as stored, as high resolution data. Namely, although all data is written into memory as high resolution data, for the most part it is read out as low resolution data through one of the selective addressing schemes described previously, except for that portion of the scene corresponding memory addresses for which are associated with high resolution data. For this segment, the read operation simply converts to a normal storage location/pixel direct read out scheme. While the bandwidth for this particular segment of the data is increased relative to the remainder of the data, the overall image itself only has a small segment of high bandwidth so that there is obtained an overall reduction in bandwidth compared with having to transmit the entirety of the image as high resolution data. The data is the modulated and transmitted via secure communication equipment 62-63, such as spread spectrum transmission equipment for transmission to the ground station.

At the ground station the incoming signals are down converted and demodulated from transceiver 54 and modem 51 equipment to obtain display control signals. The display control signals are used to control the scanning of the image pixels of the display 31, so as to generate high resolution data only at that portion corresponding to point of observation of the operator 10 and equated with that particular portion of the overall scene data stored in memory 21 aboard the remotely piloted vehicle. It has been found that the time delay from a step change in look angle by the operator 10 to a look angle correction by the oculometer 33 and changed to a new location in memory 21 from which new high resolution data is to be read out and its subsequent transmission and appearance on the display device 31 as high resolution imagery data may be less than 0.2 seconds using present day modulation and transmission rates. This minimum time delay is substantially less than the approximate 0.5 seconds required normally by the human eye before the operator becomes aware of the high resolution data that he is viewing.

In addition to the normal mode of operation above, wherein the system is continuously responsive to the look angle of the operator as detected by the oculometer equipment, the operator may choose to make a permanent record of the entirety of the scene that he is viewing. In this circumstance, an auxiliary mode control signal applied from the operator's console causes the oculometer equipment to be by passed and a separate mode signal to be transmitted to the remote vehicle. The remote vehicle contains control logic within the mode control unit 71 than respond to this signal and effectively freezes the contents of memory 21 to correspond to the latest image being observed at the display console at the ground station. Each memory location is individually addressed so that the entirety of contents of memory 21 are read out as high resolution data. The modulation transmission equipment proceeds to transmit this information to the ground station, but at a lower transmission rate than previously employed for the normal mode of operation, since the requirement of rapidly responding the the movement of the operator's look angle is no longer necessary. Namely, the system need not respond to the 0.5 second awareness factor of the operator but can transmit the high resolution data at a slower rate, thereby reducing the effect bandwidth required. This information is received at the ground station and made available for permanent recordation via a video tape recorder 52 or photographic recorder 53, as shown.

While I have shown and described one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

What is claimed is:

1. A system for displaying, at a local station a high resolution image of a portion of scene optically imaged at a remote station comprising:
    at said remote station,
    a memory;
    first means for generating high resolution data representative of said optically imaged scene to be displayed and storing said data in said memory;
    second means for selectively accessing said memory to read out therefrom a first portion of said data as high resolution image information and a second portion of said data as low resolution image information; and
    third means for transmitting signals corresponding to said first portion of said data containing said high resolution image information and said second portion of said data containing said low resolution image information to said local station; and
    at said local station,
    fourth means for generating signals representative of a prescribed portion of said scene for which a high resolution image is to be displayed; and
    fifth means for transmitting signals representative of the signals generated by said fourth means to said remote station to cause said second means to selectively access said memory to read out therefrom as high resolution image information that portion of said data corresponding to said prescribed portion of said scene.

2. A system according to claim 1, wherein said second portion of said data read out from said memory by said second means as low resolution image information corresponds to a portion or said scene adjacent to that to which said high resolution image information corresponds.

3. A system according to claim 1, wherein said system further includes, at said local station,
    a display device; and
    sixth means for receiving the signals transmitted to said local station by said third means and causing said high resolution image information to be coupled to said display device whereby a high resolution image of said portion of said scene is displayed thereby.

4. A system according to claim 3, wherein said second portion of said data read out from said memory by said second means as low resolution image information corresponds to a portion of said scene adjacent to that to which said high resolution image information corresponds.

5. A system according to claim 4, wherein said sixth means includes means for causing said low resolution image information to be coupled to said display device, whereby a low resolution image of a portion of said scene adjacent to the high resolution portion thereof is displayed by said display device.

6. A system according to claim 3, wherein said fourth means comprises means, responsive to the observation, by an operator, of a location of interest on said display device, for causing the signals generated thereby to be representative of a delimited portion of said scene associated with said location of interest on said display device at which a high resolution image is to be displayed.

7. A system according to claim 6, wherein said fourth means comprises oculometer means and head movement sensing means, respectively responsive to the eye and head movement of said operator, for generating signals representative of the location of observation by said operator on said display device at which said high resolution image is to be displayed.

8. A system according to claim 1, wherein said third and fifth means respectively include means for modifying the signals transmitted thereby so as to cause said signals to be effectively immune to jamming.

9. A system according to claim 1, wherein said system further includes an anti-jam communication link over which signals are transmitted between said remote and local stations.

10. A system according to claim 9, wherein said anti-jam communication link comprises a spread spectrum communication link.

11. A system according to claim 6, wherein said remote station comprises a remotely piloted vehicle the operation of which is controlled by said operator observing said display device.

12. A system according to claim 11, wherein said system further includes an anti-jam communication link over which signals are transmitted between said remote and local stations.

13. A system according to claim 1, where
    said second means further includes means for selectively accessing said memory to read out therefrom all the data stored thereby associated with said scene as high resolution data, and said third means includes means for transmitting signals corresponding to the entirety of said scene as high resolution data to said local station.

14. A system according to claim 13, wherein said fourth means includes means for selectively generating signals representative of the entirety of said scene for which a high resolution image is to be displayed, and said fifth means includes means for transmitting signals representative of the signals generated by said fourth means to said remote station to cause said second means to access said memory so as to read out therefrom as high resolution image information data corresponding to the entirety of the scene.

15. A system according to claim 14, wherein said system further comprises, at said local station, a display device, and sixth means for receiving the signals transmitted to said local station by said third means and causing said high resolution image information for the entirety of said scene to be displayed on said display device.

16. A system according to claim 15, wherein said system further includes, at said local station, a recording device, and wherein said sixth means includes means for causing said high resolution image information for the entirety of said scene to be recorded on said recording device.

17. A system according to claim 1, wherein said first means comprises means for continuously causing there to be generated from the entirety of said optically imaged scene high resolution image data and updating the contents of said memory with said high resolution image data.

18. A system according to claim 17, wherein said system comprises, at said remote station, optical sensor means for generating output signals representative of the entirety of the scene optically imaged thereby, and said first means includes means, coupled to said optical sensor means, for generating digital data representative said output signals and updating the contents of said memory with said digital data.

19. A system according to claim 18, wherein said second portion of said data read out from said memory by said second means as low resolution image information corresponds to a portion of said scene adjacent to that to which said high resolution image information corresponds.

20. A system according to claim 18, wherein said system further includes, at said local station, a display device; and sixth means for receiving the signals transmitted to said local station by said third means and causing said high resolution image information to be coupled to said display device whereby a high resolution image of said portion of said scene is displayed thereby.

21. A system according to claim 20, wherein said fourth means comprises means, responsive to the observation, by an operator, of a location of interest on said display device, for causing the signals generated thereby to be representative of a delimited portion of said scene associated with said location of interest on said display device at which a high resolution image is to be displayed.

22. A system according to claim 21, wherein said system further includes an anti-jam communication link over which signals are transmitted between said remote and local stations.

23. A system according to claim 22, wherein said remote station comprises a remotely piloted vehicle the operation of which is controlled by said operator observing said display device.

24. A system according to claim 23, wherein said second portion of said data read out from said memory by said second means as low resolution image information corresponds to a portion of said scene adjacent to that to which said high resolution image information corresponds.

25. A system according to claim 24, wherein said sixth means includes means for causing said low resolution image information to be coupled to said display device, whereby a low resolution image of a portion of said scene adjacent to the high resolution portion thereof is displayed by said display device.

26. A system according to claim 25, wherein said fourth means comprises oculometer means and head movement sensing means, respectively responsive to the eye and head movement of said operator, for generating signals representative of the location of observation by said operator on said display at which said high resolution image is to be displayed.

27. A video storage and retrieval system comprising:

a memory;

first means for generating high resolution data representative of an optically imaged scene and causing said data to be stored in said memory; and second means for selectively accessing said memory to read out therefrom a first portion of said data as high resolution image information and a second portion of said data as low resolution image information.

28. A video storage and retrieval system according to claim 27, further including third means for transmitting signals corresponding to said first portion of said data containing said high resolution image information and said second portion of said data containing said low resolution image information.

29. A video storage and retrieval system according to claim 27, wherein said second portion of said data read out from said memory by said second means as low resolution image information corresponds to a portion of said scene adjacent to that to which said high resolution image information corresponds.

30. A video storage and retrieval system according to claim 28, wherein said second means further includes means for selectively accessing said memory to read out therefrom all the data stored thereby associated with said scene as high resolution data, and said third means includes means for transmitting signals corresponding to the entirety of said scene as high resolution data.

31. A video storage and retrieval system according to claim 27, wherein said first means comprises means for continuously causing there to be generated from the entirety of said optically imaged scene high resolution image data and updating the contents of said memory with said high resolution image data.

32. A video storage and retrieval system according to claim 27, wherein said system comprises optical sensor means for generating output signals representative of the entirety of the scene optically imaged thereby, and said first means includes means, coupled to said optical sensor means, for generating digital data representative said output signals and updating the contents of said memory with said digital data.

33. A video storage and retrieval system according to claim 28, wherein said third means includes means for modifying the signals transmitted thereby so as to cause said signals to be effectively immune to jamming.

34. A video storage and retrieval system according to claim 28, wherein said third means includes means for transmitting signals over a spread spectrum communication link.

35. A video storage and retrieval system according to claim 27, wherein said system is equipped for use aboard a remotely piloted vehicle and said second means includes means, responsive to control signals from a control station, for selectively accessing said memory in accordance therewith.

36. For use with a remote device having a memory in which are stored high resolution data representative of an optically imaged scene to be displayed, and being adapted to be coupled to a display device upon which said scene may be displayed to an operator, a system for controlling the presentation of scene data to said operator comprising:
   first means for sensing the location of the visual observation by said operator on said display device and, in response thereto, generating first signals identifying a prescribed portion of the scene containing said location of visual observation; and
   second means, responsive to said first signals generated by said first means, for causing said remote device to transmit second signals as high resolution information representative of the high resolution data stored in said memory that corresponds to said prescribed portion of the scene containing said location of visual observation, and third signals as low resolution information representative of scene data stored in said memory other than that corresponding to said prescribed portion.

37. A system according to claim 36, wherein said system further comprises
   third means, coupled to said display device and responsive to said second and third signals, for causing the scene image displayed by said display device to be displayed as a high resolution image within said prescribed portion thereof and as a low resolution image at a portion other than said prescribed portion thereof.

38. For use with a remote device having a memory in which are stored high resolution data representative of a scene to be displayed and with a display device upon which said scene may be displayed to an operator, a method of controlling the presentation of scene data to said operator comprising the steps of:
   (a) sensing the location of visual observation by said operator on said display device and thereby identifying a prescribed portion of the scene containing said location of visual observation; and
   (b) in response to step (a), causing said remote device to transmit high resolution information signals representative of high resolution scene data stored in said memory that corresponds to said prescribed portion of the scene containing said location of visual observation, and low resolution information signals representative of scene data stored in said memory other than that corresponding to said prescribed portion.

39. A method according to claim 38, further comprising the steps of:
   (c) in response to step (b), causing the scene image displayed by said display device to be displayed as a high resolution image within said prescribed portion thereof and as a low resolution image at a portion other than said prescribed portion thereof.

40. A system for displaying, at a local station, a high resolution image of a portion of scene optically imaged at a remote station comprising:
   at said remote station,
   a memory;
   first means for generating high resolution data representative of said optically imaged scene to be displayed and storing said data in said memory;
   second means for selectively accessing said memory to read out therefrom a first portion of said data as high resolution image information and a second portion of said data as low resolution image information; and
   third means for transmitting signals corresponding to said first portion of said data containing said high resolution image information and said second portion of said data containing said low resolution image information to said local station; and
   at said local station,
   display means for visually displaying the images representative of said first and second portions of said data;
   fourth means for sensing the location on said display means the visual observation by the operator and, in response thereto, generating signals identifying that portion as requiring high resolution image information; and
   fifth means for transmitting signals representative of the signals generated by said fourth means to said remote station to cause said second means to selectively access said memory to read out therefrom as high resolution image information that portion of said data corresponding to said prescribed portion of said scene.

41. A system according to claim 40, wherein said second portion of said data read out from said memory by said second means as low resolution image information corresponds to a portion or said scene adjacent to that to which said high resolution image information corresponds.

42. A system according to claim 40 further including, at said local station,
   sixth means for receiving the signals transmitted to said local station by said third means and causing said high resolution image information to be coupled to said display means, whereby a high resolution image of said portion of said scene is displayed thereby.

43. A system according to claim 42, wherein said sixth means includes means for causing said low resolution image information to be coupled to said display means, whereby a low resolution image of a portion of said scene adjacent to the high resolution portion thereof is displayed by said display means.

44. A system according to claim 40, wherein said fourth means comprises means, responsive to the observation by an operator of a location of interest on said display means, for causing the signals generated thereby to be representative of a delimited portion of said scene associated with said location of interest on said display means at which a high resolution image is to be displayed.

45. A system according to claim 44, wherein said fourth means comprises oculometer means and head movement sensing means, respectively responsive to the eye and head movement of said operator, for generating signals representative of the location of observation by said operator on said display means at which said high resolution image is to be displayed.

46. A system according to claim 40, wherein said system comprises, at said remote station, optical sensor means for generating output signals representative of the entirety of the scene optically imaged thereby, and said first means includes means, coupled to said optical sensor means, for generating digital data representative of said output signals and updating the contents of said memory with said digital data.

47. A system according to claim 46, wherein said second portion of said data that is read out from said memory by said second means as low resolution image information corresponds to a portion of said scene adjacent to that to which said high resolution image information corresponds.

* * * * *